(12) United States Patent
Landhuis

(10) Patent No.: US 6,964,163 B2
(45) Date of Patent: Nov. 15, 2005

(54) DUAL CHECK-RELIEF VALVE

(75) Inventor: Kevin J. Landhuis, Ankeny, IA (US)

(73) Assignee: Sauer-Danfoss, Inc., Ames, IA (US)

( * ) Notice: Subject to any disclaimer, the term of this patent is extended or adjusted under 35 U.S.C. 154(b) by 45 days.

(21) Appl. No.: 10/704,881

(22) Filed: Nov. 10, 2003

(65) Prior Publication Data

US 2005/0097887 A1    May 12, 2005

(51) Int. Cl.⁷ .............................................. F16D 31/02
(52) U.S. Cl. ......................................... 60/464; 60/489
(58) Field of Search ......................... 60/464, 468, 489; 137/102, 493.3

(56) References Cited

U.S. PATENT DOCUMENTS

| | | |
|---|---|---|
| 2,870,781 A | 1/1959 | Tennis |
| 3,650,291 A | 3/1972 | Adams, et al. |
| 4,346,733 A | 8/1982 | Grawunde |
| 4,518,004 A | 5/1985 | Hsu et al. |
| 4,617,797 A | 10/1986 | Williams |
| 4,696,162 A | 9/1987 | Williams |
| 4,936,095 A | 6/1990 | Ross et al. |
| 5,165,233 A | 11/1992 | Betz |
| 6,698,197 B1 * | 3/2004 | Peterson ...................... 60/464 |

* cited by examiner

Primary Examiner—Edward K. Look
Assistant Examiner—Michael Leslie

(57) ABSTRACT

A dual check and high pressure relief valve that is able to perform the function of a hydrostatic high pressure relief valve and a check valve. The new valve has two poppets separated by a spring that are within two seats within a guide and secured by a plug. By adjusting the seats the relief pressure setting is set. The dual check and high pressure relief valve has three separate passageways that allow fluid flow between different combinations of the passages depending upon the function desired within the hydrostatic circuit. A dashpot is also included between the two poppets to provide positive dampening of the system.

10 Claims, 5 Drawing Sheets

DUAL CHECK-RELIEF VALVE

BACKGROUND OF THE INVENTION

This invention relates to a dual check relief valve for a hydrostatic circuit. Typical hydrostatic circuits use two check relief valves; the first is closed and will act as a high pressure relief valve if the high pressure side of the hydrostatic circuit exceeds the valve setting. The second check relief valve has the check valve open to allow charge flow into the pump. When the pump is stroked to reverse flow, the first check relief valve will open to allow charge flow into the pump and the second check relief will close and operate as a high pressure relief valve.

Though a two valve system is effective in allowing a hydrostatic circuit to function, the manufacturing of two separate valves can cause great cost in the manufacturing process of the valves. Furthermore, because one must machine two different valves in the manufacturing process, this process can take a lot of time. Therefore, it is desired in the art to have a single valve that is able to provide the functionality of the two separate check relief valves in a hydrostatic circuit. By having only a single valve manufacturing costs and time would be greatly reduced.

Therefore, it is a primary object of the present invention to provide a dual check relief valve for a hydrostatic circuit that improves upon the state of the art.

Yet another object of the present invention is to provide a single valve that will provide check and relief functionality for two flow directions in a hydrostatic loop.

Another object of the present invention is to provide a single valve in a hydrostatic loop so that end caps can be smaller.

Yet another object of the present invention is to reduce machining time and cost in manufacturing the hydrostatic pump.

Another object of the present invention is to reduce the cost of providing check relief within a hydrostatic circuit.

A further object of the present invention is to use a dashpot to provide positive dampening of the relief function.

These and other objects, features, or advantages of the present invention will become apparent from the specification and claims.

BRIEF SUMMARY OF THE INVENTION

The present invention is a check relief valve that provides the functionality of dual check relief valves. The check relief valve has a first and second poppet that is operably connected to a spring within a guide. The first and second poppet are disposed within a first seat and second seat respectfully. The dual check valve has three separate fluid passages, one in fluid communication with the high pressure line of the hydrostatic circuit, the second in fluid communication with the low pressure side of the hydrostatic circuit, and one in fluid communication with the charge pressure line within the hydrostatic circuit. By being fluidly connected to all three of the fluid lines in the hydrostatic circuit the check valve of the present invention is able to use a spring and poppet design to route fluid through the circuit as desired, thus accomplishing the functionality of two separate check relief valves.

DESCRIPTION OF THE PREFERRED EMBODIMENTS OF THE INVENTION

Figure 1:
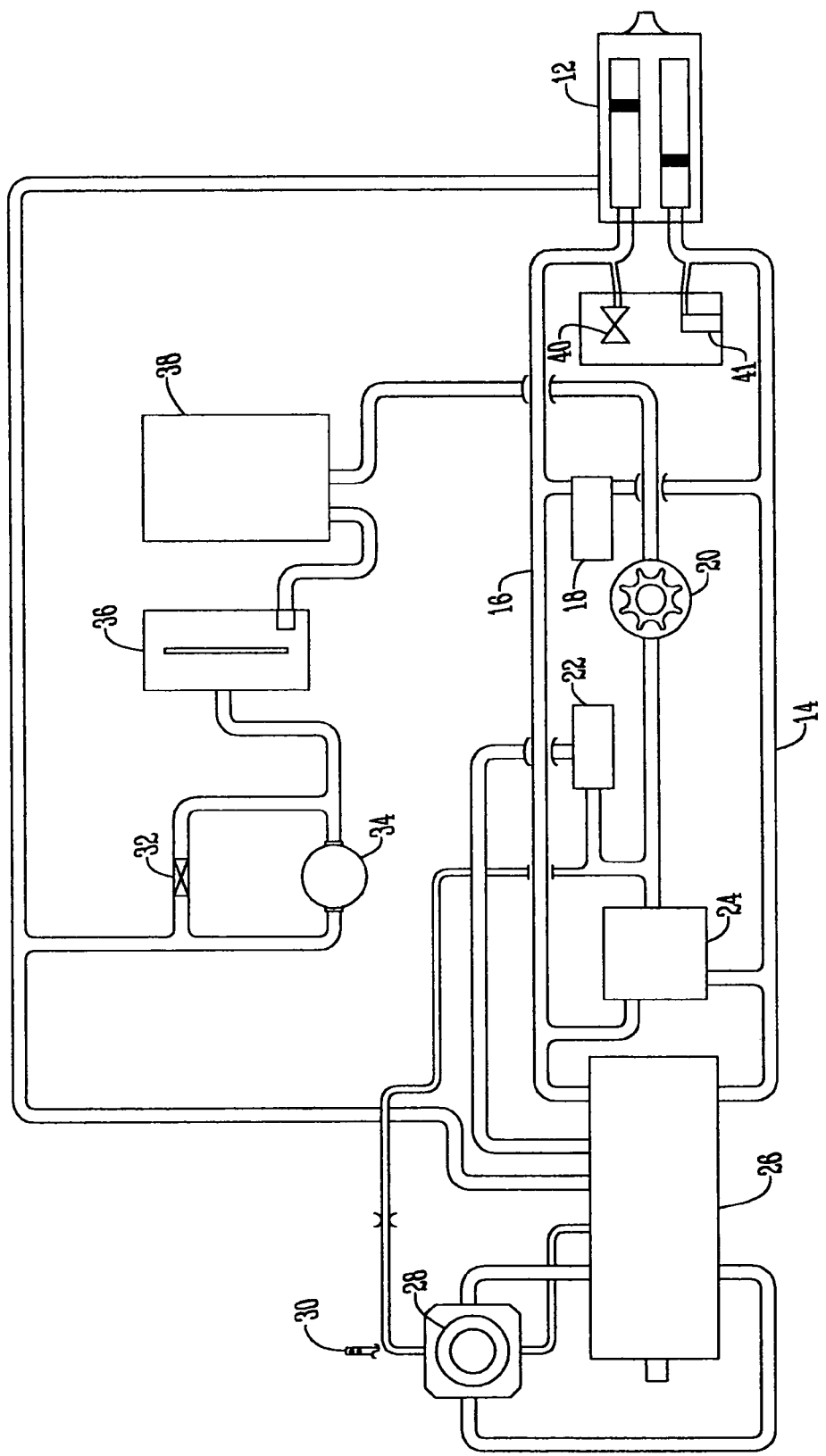
FIG. 1 is a schematic of a typical hydrostatic circuit having the dual check and high relief pressure valve of the present invention.

FIG. 1 shows a typical hydrostatic circuit 10 having a motor 12 that provides fluid to a high pressure fluid line 14 and a low pressure fluid line 16 wherein bypass valve 18 determines which side of the hydrostatic circuit has the low or high pressure. The hydrostatic circuit 10 also has a charge pump 20 that sends fluid to a charge relief valve 22 and a dual check and high pressure valve 24. The dual check and high pressure relief valve also receives fluid from the high and low pressure lines 14 and 16 respectfully. Fluid from the high and low pressure lines 14 and 16 flows into a pump 26 that is fluidly connected to displacement control valve 28 that is controlled by control handle 30. Also, within the circuit is a heat exchanger bypass 32, a heat exchanger 34, a reservoir 36, and a filter 38. The hydrostatic circuit 10 may also have a charge pressure relief valve 40 or loop flushing module 41.

Figure 2:
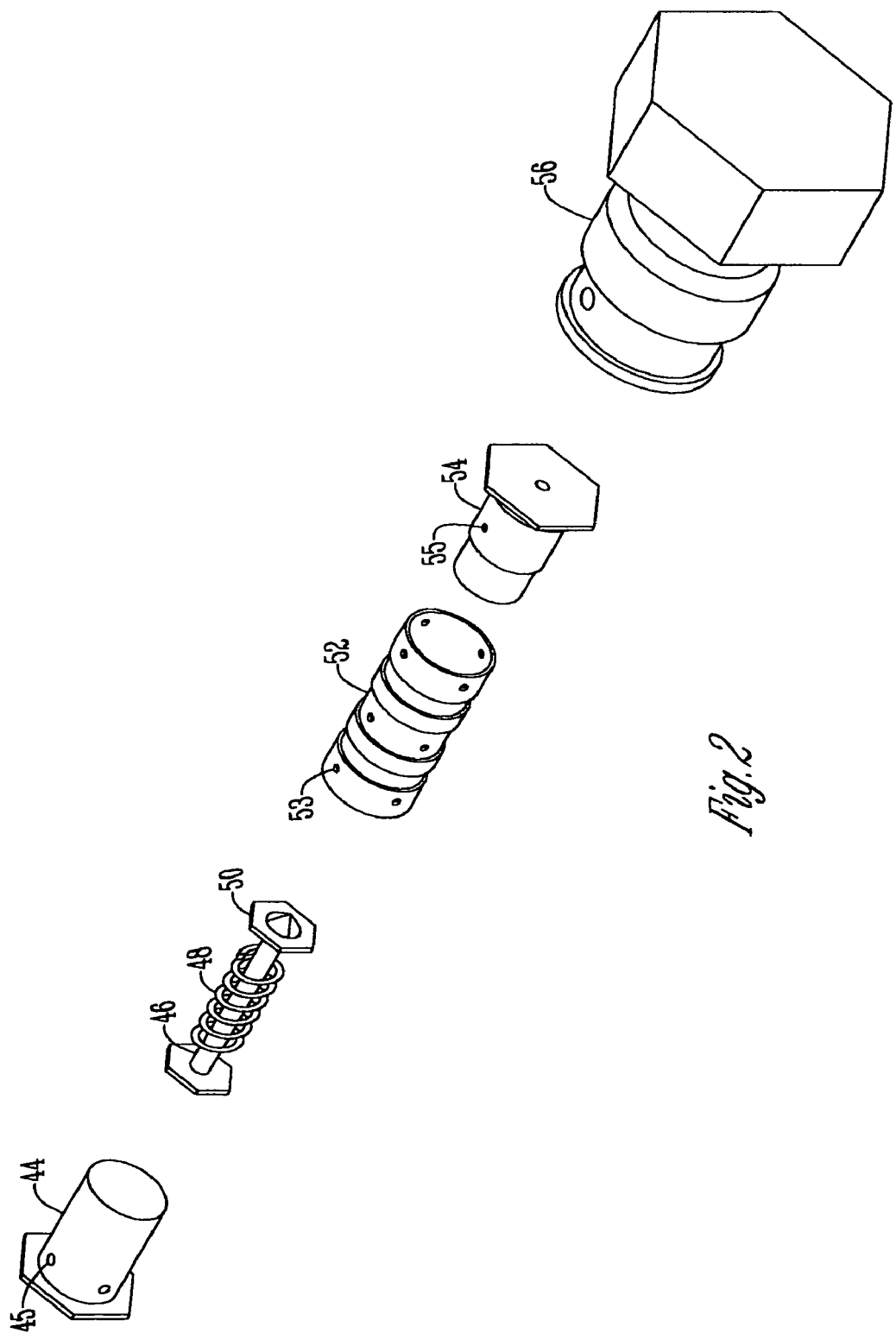
FIG. 2 is a perspective view of the valve components used within the dual check and high pressure relief valve.

The dual check and high pressure relief valve 24 has valve components that are seen in FIG. 2. The valve components include a first seat 44 having openings 45 that has a first poppet 46 and a spring 48 disposed therethrough. The spring 48 is also connected to a second poppet 50, and the first valve seat 44, first poppet 46, spring 48, and second poppet 50 are disposed through guide 52 having flow holes 53 and is connected to second seat 54 having openings 55. The components are sealed off by plug 56. The poppets 46 and 50 and spring 48 are assembled inside the guide 52 and then the threaded seats 44 and 54 are screwed together with the guide 52 in place. By rotating the first and second seats 44 and 54 until the proper spring load is reached the relief pressure is set. The first and second seats 44 and 54 are then locked by crimp or weld through the flow holes 53 in the center of the guide 52. After assembling and setting the relief pressure the plug 56 is attached to the guide 52 to form a single cartridge.

Figure 3:
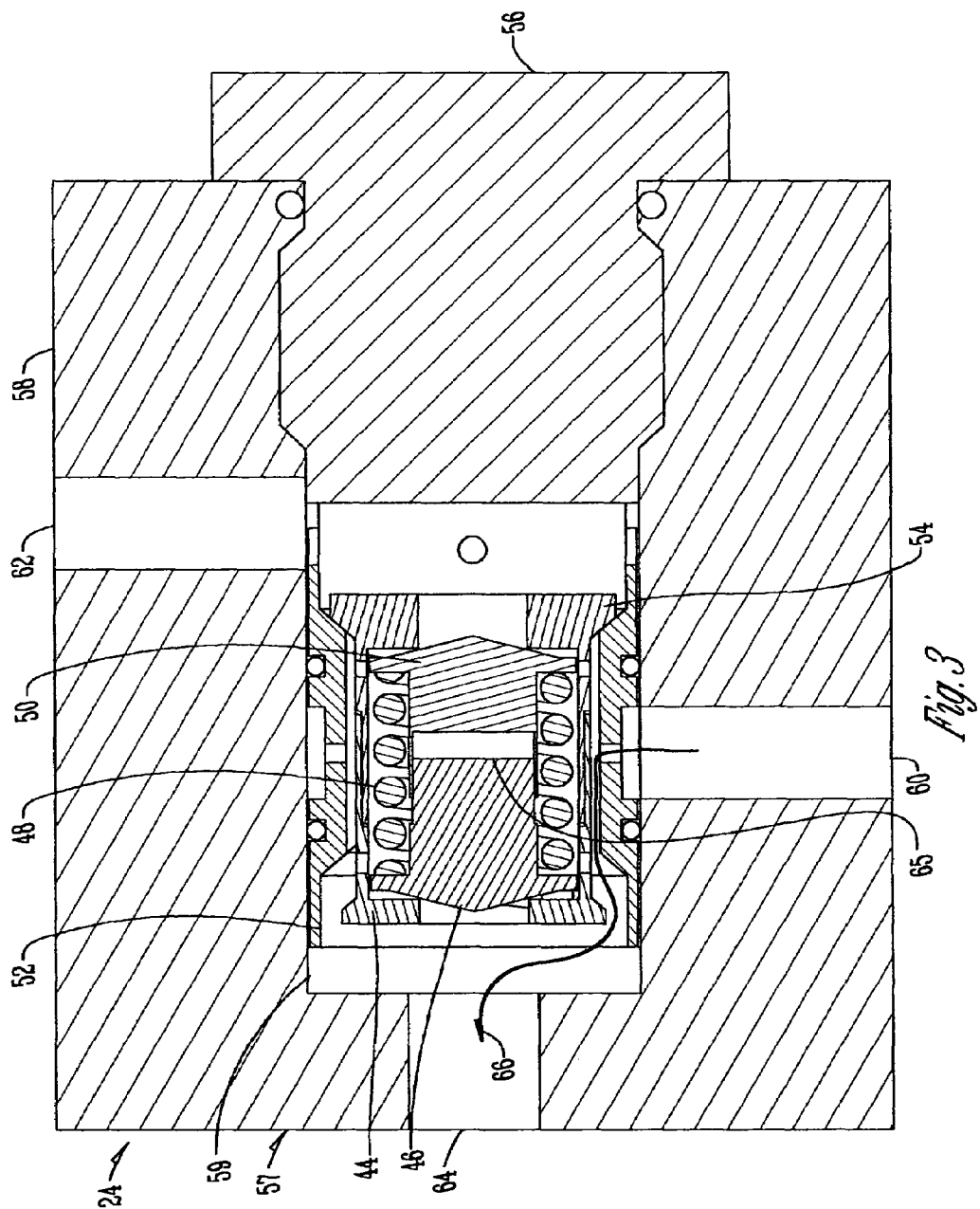
FIG. 3 is a sectional view of the dual check and high pressure relief valve in normal operation.
Figure 4:
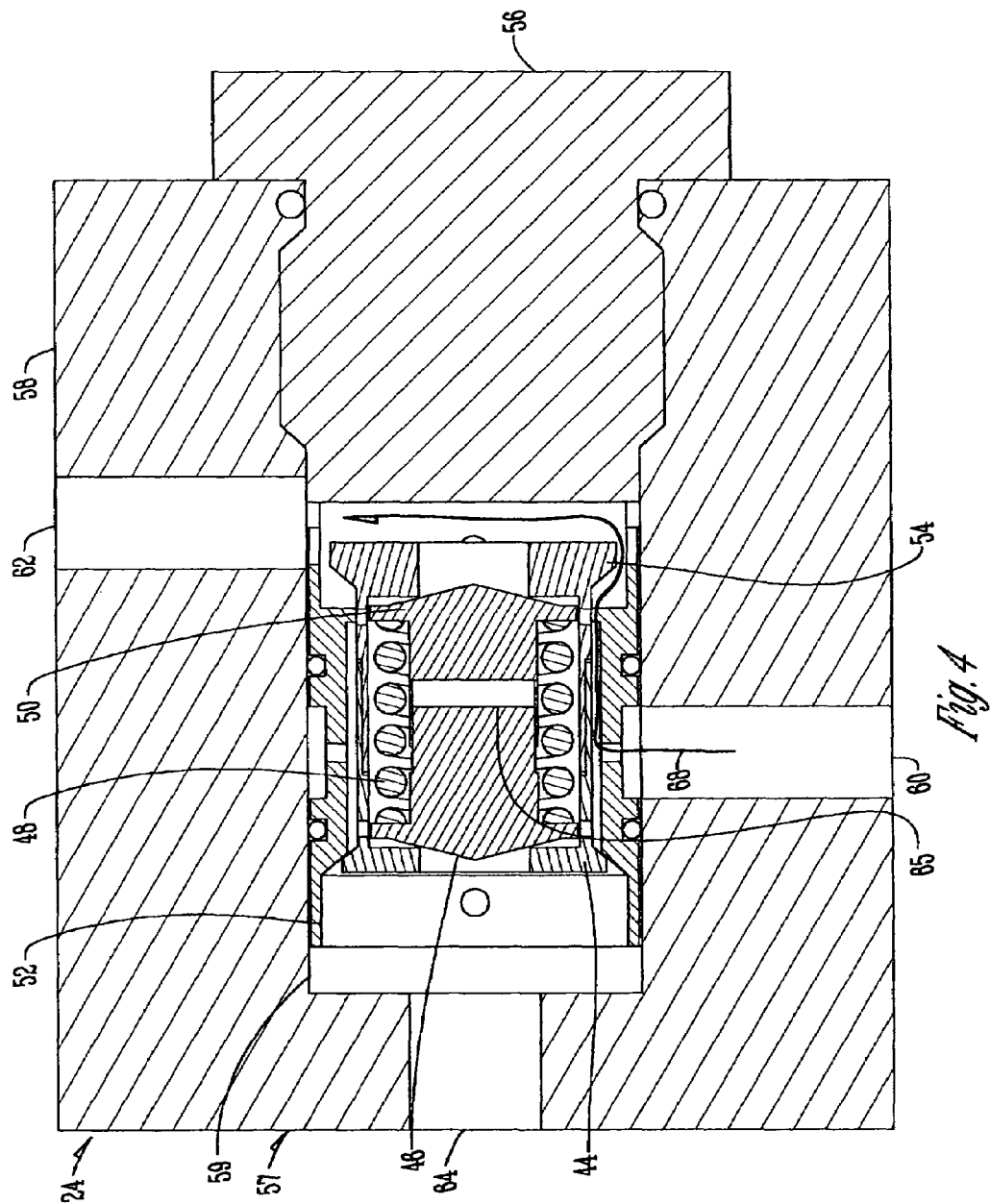
FIG. 4 is a sectional view of the dual check and high pressure relief valve with reversed flow.
Figure 5:
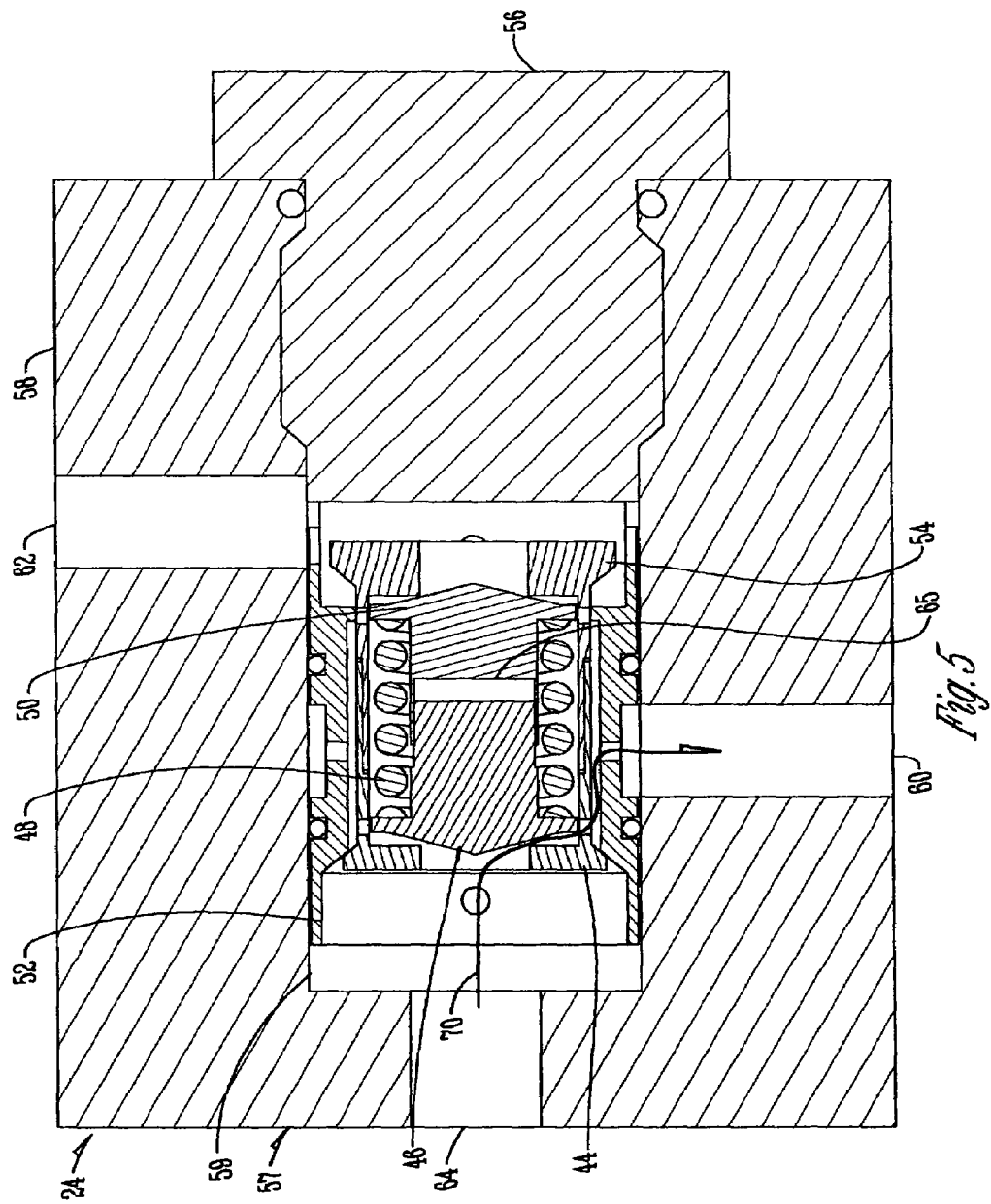
FIG. 5 is a sectional view of the dual check and high pressure relief valve when the valve is in relief mode.

As seen in FIGS. 3–5 the dual check and high pressure relief valve 24 has a housing 57 that includes an end cap 58, a central bore 59, a first fluid passageway 60, a second passageway 62, and a third passageway 64. A dashpot 65 is operably connected to the first and second poppets, 46 and 50.

In operation the first passageway 60 is ported for flow from the charge pump 20, the second passageway is ported to the low pressure line 16, and the third passageway 64 is ported to the high pressure line 14. Within valve 24 openings 45, 53, and 55 allow fluid flow. As shown in FIG. 3 the valve 24 acts as a check valve by blocking flow from the second passageway 62 and allowing charge flow from first passageway 60 to third passageway 64 along fluid flow path 66. FIG. 4 shows an operation wherein the check valve is reversed to block flow from the third passageway 64 and to allow flow from the first passageway 60 to the second passageway 62 creating a second fluid flow path 68. As seen in FIG. 5, when the valve 24 is in a relief mode fluid flows from the third fluid passageway 64 to the first fluid passageway 60 along third fluid flow path 70. When the relief or first poppet 46 moves it forces fluid out of the dash pot 65 through a small clearance and therefore dampens any poppet 46 and 50 oscillation that would cause unsteady flow or fluid foreign noise.

It should be appreciated that this valve provides check and relief function for two flow directions in a hydrostatic loop. Because only a single valve is used, a smaller end cap can be used, machining time and costs are reduced, and cost of manufacturing the hydrostatic circuit are reduced. Furthermore, because of the dashpot between the two poppets, positive dampening of the relief function is present. Therefore, all of the objectives of the present invention have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A hydrostatic circuit that provides check and relief functions for sequential fluid flow in opposite directions comprising:
    a motor having a first and second fluid outlets;
    a first fluid line fluidly connected to the first fluid outlet of the motor;
    a second fluid line fluidly connected to the second fluid outlet of the motor;
    a pump fluidly connected to the motor via the first and second fluid lines;
    a dual check and high pressure relief valve having a housing with a bore and first, second, and third passageways fluidly connected to the first and second fluid lines;
    said first fluid line fluidly connected to the first passageway;
    said second fluid line fluidly connected to the second passageway;
    a first poppet disposed within the bore and adapted to block at least one of the passageways;
    a spring operably connected to the first poppet and adapted to actuate the first poppet;
    a second poppet disposed within the bore operably connected to the spring;
    said dual check and high pressure relief valve adapted to provide check and relief functions for sequential fluid flow in opposite directions in the hydrostatic circuit; and
    a charge pump fluidly connected to the third passageway in the dual check and high pressure relief valve.

2. A dual check and high pressure relief valve for a hydrostatic circuit having a high pressure fluid line, a low pressure fluid line, and a charge pressure fluid line adapted to provide check and relief functions for sequential fluid flow in opposite directions comprising:
    a housing having a first passageway fluidly connected to the charge pressure fluid line, a second passageway fluidly connected to the low pressure line, a third passageway fluidly connected to the high pressure fluid line, and a bore;
    a first poppet disposed within the bore and adapted to block at least one of the passageways;
    a spring operably connected to the first poppet and adapted to actuate the first poppet;
    a second poppet disposed within the bore operably connected to the spring; and
    said spring adapted to actuate the poppets to control sequentially fluid flow in one of said opposite directions.

3. The dual check and high pressure relief valve of claim 2 wherein the fluid flow can be controlled to be reversed, relieved, or checked.

4. The dual check and high pressure relief valve of claim 2 further comprising a dashpot disposed between the first and second poppet.

5. The dual check and high pressure relief valve of claim 2 wherein the valve acts as a check valve by blocking flow from the second passageway and allowing charge flow from the first passageway to the third passageway along a fluid flow path.

6. The dual check and high pressure relief valve of claim 2 wherein the valve is reversed by blocking flow from the third passageway and allowing flow from the first passageway to the second passageway along a fluid flow path.

7. The dual check and high pressure relief valve of claim 2 wherein the valve is in a relief mode when fluid flows from the third fluid passageway to the first fluid passageway along a fluid flow path.

8. A dual check and high pressure relief valve for a hydrostatic circuit adapted to provide fluid flow operating modes to be reversed, relieved or checked comprising:
    a housing having a plurality passageways and a bore disposed therethrough;
    a hollow guide having a plurality of openings and a first and second open ends detachably disposed through the bore;
    a first seat having a plurality of openings disposed through the first open end of the guide;
    a second seat having a plurality of openings disposed through the second open end of the guide and adapted to be securably attached to the first seat;
    a first poppet disposed through the first seat;
    a second poppet disposed through the second seat;
    a spring operably connected to the first and second poppets to actuate them; and
    said actuating of poppets determining the operating modes of the valve.

9. The dual check and high pressure relief valve of claim 8 further comprising a dashpot disposed between the first and second poppets.

10. The dual check and high pressure relief valve of claim 9 wherein the dashpot dampens poppet oscillation.

* * * * *